No. 729,536. PATENTED JUNE 2, 1903.
S. J. BROWN.
DISH WASHER.
APPLICATION FILED NOV. 22, 1902.
NO MODEL.

Witnesses
S. J. Brown, Inventor
by
Attorneys

No. 729,536. Patented June 2, 1903.

UNITED STATES PATENT OFFICE.

SAMUEL J. BROWN, OF LEITCHFIELD, KENTUCKY, ASSIGNOR OF ONE-HALF TO WILLIAM A. MORGAN, OF EASTMAN, GEORGIA.

DISH-WASHER.

SPECIFICATION forming part of Letters Patent No. 729,536, dated June 2, 1903.

Application filed November 22, 1902. Serial No. 132,484. (No model.)

*To all whom it may concern:*

Be it known that I, SAMUEL J. BROWN, a citizen of the United States, residing at Leitchfield, in the county of Grayson and State of Kentucky, have invented a new and useful Dish-Washer, of which the following is a specification.

This invention relates to improvements in dish-washers, and has for its object the production of a simply-constructed and easily-operated device in which the dishes may be thoroughly washed and means provided for their drainage; and the invention consists in certain novel features of construction hereinafter fully described, illustrated in the accompanying drawings, and specified in the claims hereto appended.

Figure 1:
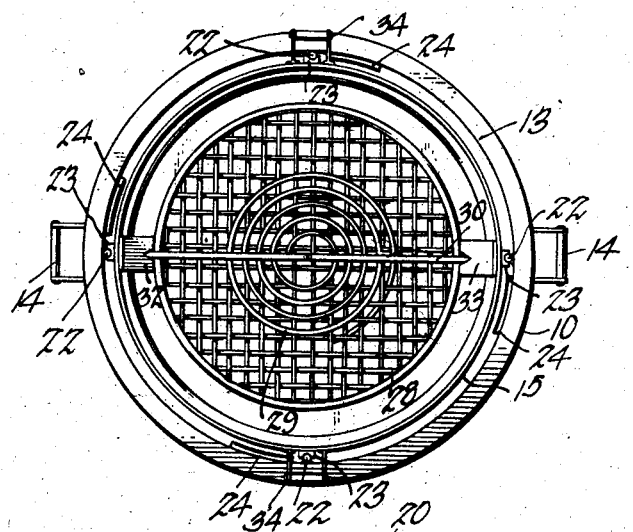
Figure 2:
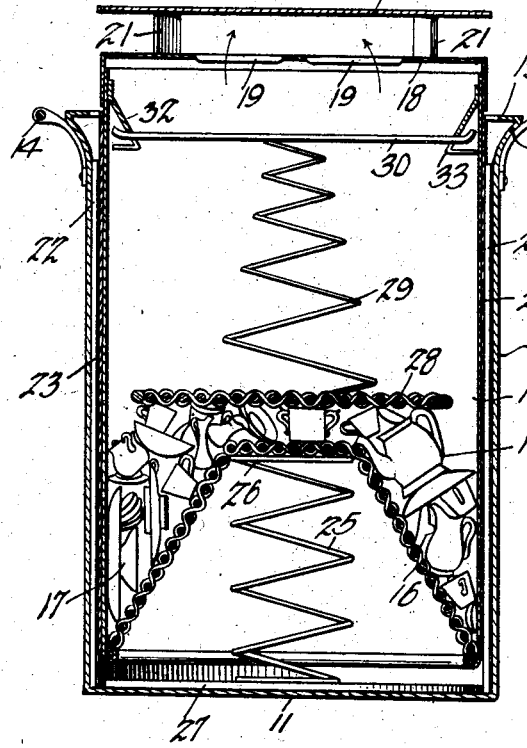
Figure 3:
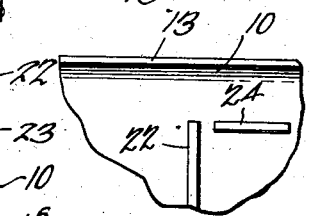

In the drawings illustrative of the invention, in which like reference characters are employed to indicate corresponding parts in all the figures, Figure 1 is a plan view with the cover detached. Fig. 2 is a vertical sectional elevation. Fig. 3 is an enlarged detail illustrating the construction of the supporting means while the dishes are being drained.

The improved device consists of an outer casing 10 with a closed bottom 11 and open at the top, with the upper portion flaring outwardly, as indicated at 12, and with an inwardly-extending annular flange 13 between the outwardly-flaring top and the interior of the casing, the inner surface of the annular rim coming in vertical alinement with the interior surface of the casing, as indicated.

The casing 10 will be provided with handles 14 to assist in transporting it.

Within the outer casing 10 is an inner casing 15, which is longitudinally movable therein and is provided with an upwardly-extending perforated conical bottom 16 and handles 34. The side walls of the inner casing 15 will be imperforate, as shown, and the conical bottom 16 will preferably be formed of comparatively heavy wire netting or screening of sufficient strength to support the dishes to be washed, as shown at 17.

The upper end of the inner casing 15 will extend a short distance above the outer casing 10 when the inner casing 15 is in its lowermost position, the extended portion provided with a cover 18, the cover provided with a plurality of vent-apertures, (indicated at 19,) and the apertures being of any desired form and arranged in any desired manner and adapted to provide for the escape of the surplus steam or hot air.

Disposed above the cover 18 and spaced therefrom is a shield or guard-plate 20, preferably of the same diameter as the cover and connected thereto by standards 21, spaced apart, as shown. The shield 20 serves as a guard to prevent the steam rising upwardly in the face of the operator and will likewise check and divert any water which may spatter through the apertures 19 and divert it laterally. This is an important feature of the invention and adds materially to the value and usefulness of the device and to the comfort and convenience of the operator.

Longitudinally disposed between the two casings at suitable distances apart are guide members 22, which provide for the vertical movement of the inner casing relative to the outer casing and prevent the rotation of the inner casing within the outer casing.

The guide members 22 will preferably be attached to the interior of the outer casing and the inner casing will be provided with concaved ribs 23, engaging the guides, as shown in Fig. 1; but these relative positions may be reversed and the guides placed upon the inner casing and the concaved ribs upon the outer casing, if preferred.

The guide-ribs 22 do not extend quite to the top of the outer casing 10, as indicated in Fig. 2, and located upon the interior of the outer casing are stop-ribs 24, horizontally disposed and adapted to support the inner casing in an elevated position to permit the dishes to drain. By this arrangement when the inner casing is elevated above the upper ends of the ribs 22 and turned slightly the lower ends of ribs 23 on the inner casing will pass over the ribs 24 in position to be supported thereby as long as may be desired to permit the dishes to be thoroughly drained and supported in position to have hot water poured through them from above, and thus thoroughly rinse them.

Between the conical bottom 16 of the inner casing 15 and the bottom 11 of the outer casing 10 is loosely disposed a spring 25, the upper coil of the spring being formed into a hoop or ring 26 and the lower end of the spring rigidly connected to a plate 27, extending laterally to the sides of the outer casing and resting upon the interior of the bottom 11, by which means the spring is firmly supported and all lateral movement prevented. The spring 25 will thus be detachably maintained in position and exert its force upwardly against the inner casing and tend to move it upwardly.

Within the inner casing 15, between the conical bottom 16 and the cover 18, is located a follower-plate 28, the follower-plate being spring-pressed yieldably upon the upper sides of the dishes upon the conical bottom 16, as shown in Fig. 2.

The spring to which is attached the follower 28 is indicated at 29 and will be provided with a transverse bar 30, connected to its upper end, the ends of the bar adapted to detachably engage notched clips 32 33 upon the inner sides of the inner casing near its upper end, as shown, this arrangement providing for the ready attachment and detachment of the follower and its spring in position within the inner casing.

When the device is to be employed, the cover 18 and follower 28 are detached and the dishes 17 disposed in position upon the conical bottom 16, the dishes being preferably placed so that the water will freely reach every part and will be so adjusted that correspondingly-shaped surfaces will not engage, and thus prevent the water coming in contact with every part of the surfaces of all of the dishes. The follower-plate 28 is then adjusted in position and the spring 29 compressed and locked in position by the bar 30 being engaged with the catches 32 33. The cover 18 is then attached and the inner casing set in place within the outer casing, the outer casing having been previously supplied with the hot water, to which the necessary amount of soap has been added. The inner casing is then moved rapidly upward and downward by its handles 34, which action causes the water to be violently agitated in contact with the dishes and thoroughly cleanses them from adhering particles, and the agitation will be continued as long as may be required. After the dishes have been thus washed the inner casing will be elevated until its lower rim is above the upper ends of the guides 22, when it will be turned slightly to cause the casing to be supported by the lateral ribs 24, as above noted, to permit the dishes to thoroughly drain. The rinsing-water may be poured through the dishes while thus supported, if desired, or the inner casing may be removed entirely from the outer casing and the dish-water replaced by clean rinsing-water and the dish-supporting casing returned to the outer casing and the agitation repeated to produce the proper rinsing effect and the dishes drained, as above described.

While the agitation of the dish-supporting casing is taking place, any of the water which may be thrown upward between the casings will be caught by the inwardly-extending flange 13 and be thrown downward again, and thus effectually prevented from being thrown outward between the casings. This is a very important feature of the invention and effectually prevents the escape of water from the inner casing while the device is in operation.

The follower-plate 28 will be preferably formed of a section of heavy wire screening, but may be of any other suitable construction or material having the requisite interstices or perforations, and the conical bottom 16 may likewise be formed of any suitable material having the requisite openings therethrough.

The spring 25 exerts its force to materially assist in the operation of the inner casing, materially reducing the force necessary to elevate it, and thus greatly lessening the labor required to operate the device.

The casings 10 15 may be formed of any desired size and will be manufactured in different sizes to adapt the device to small families or to the largest hotels or restaurants.

The conical bottom 16 enables the dishes to be disposed substantially upon edge, so that both their exteriors and interiors will be exposed to the action of the water and all adhering matter thereby removed. The conical form of the bottom 16 also effectually prevents any sagging of the bottom by the weight of the dishes and likewise provides for the location of the spring 25 and its effective operation without increasing the length of the device.

The device is very simple and inexpensive in construction, efficient in operation, and enables dishes, pans, and similar vessels to be washed, rinsed, and dried without the hands of the operator coming in contact with the water, so that water of a high temperature may be employed with more efficient action upon the dishes. The dish-water is also used with great economy, as a comparatively small amount of water may be employed, the violent agitation causing the water to be thrown into contact with all parts of the dishes. The follower-plate 28 being held in engagement with the dishes by the spring 29 prevents the dishes being displaced during the action of the device, and thus obviates any tendency to breakage.

The coaction between the imperforate sides and the perforated conical bottom of the dish-supporting casing extending upwardly into the casing is also productive of very great advantage in operating the device, as the dishes are thereby supported in position to be acted upon by the lateral movement of the water produced by the rapid vertical movement of the inclined sides of the conical bottom through the water, by which means a very violent lateral, as well as vertical, movement of the water is produced, which greatly increases the efficiency of the device, as will be obvious.

The dish-supporting casing may be operated by the handles 34 or otherwise.

Changes in the form, proportions, and minor details of construction may be resorted to without departing from the principle of the invention or sacrificing any of its advantages.

Having thus described the invention, what is claimed is—

1. A dish-washer comprising an imperforate outer casing closed at the bottom, an inner casing slidably disposed relative to said outer casing and having a perforated conical bottom extending upwardly therein and supporting the dishes, a spring-actuated perforated follower-plate in said inner casing yieldably engaging the dishes therein, substantially as described.

2. A dish-washer comprising an imperforate outer casing closed at the bottom, an inner casing slidably disposed relative to said outer casing and having a perforated conical bottom extending upwardly therein and supporting the dishes, a spring between the bottoms of said casings and exerting its force upwardly against said inner casing, and a spring-actuated perforated follower in said inner casing and engaging the dishes therein, substantially as described.

3. A dish-washer comprising an imperforate outer casing closed at the bottom, an inner casing slidably disposed relative to said outer casing and having a perforated bottom supporting the dishes, a perforated follower engaging the dishes within the casing, a spring disposed to yieldably hold said follower in position, a bar transversely connected to said spring, notched clips oppositely disposed within said casing and adapted to detachably engage said supporting-bar, substantially as described.

4. A dish-washer comprising an imperforate outer casing closed at the bottom, an inner casing slidably disposed relative to said outer casing, a cover on said inner casing provided with one or more vent-openings, and a shield spaced from said cover and supported therefrom, whereby the escaping steam or hot water will be diverted laterally, substantially as described.

5. A dish-washer comprising an imperforate outer casing closed at the bottom, an inner casing slidably disposed relative to said outer casing and having a perforated bottom, and a spring-actuated perforated follower-plate in said inner casing and engaging the dishes therein, substantially as described.

6. A dish-washer comprising an imperforate outer casing closed at the bottom, an inner casing slidably disposed relative to said outer casing and having a perforated bottom, a bar across the upper portion of the inner casing, a perforated follower-plate engaging the dishes, and a spring disposed between said bar and said follower-plate to maintain said follower-plate in yieldable engagement with the dishes, substantially as described.

In testimony that I claim the foregoing as my own I have hereto affixed my signature in the presence of two witnesses.

SAMUEL J. BROWN.

Witnesses:
W. H. COPPAGE,
W. W. MANZEY.